US007034509B2

(12) United States Patent
Kusko

(10) Patent No.: US 7,034,509 B2
(45) Date of Patent: Apr. 25, 2006

(54) MULTIPLE VOLTAGE GENERATING

(76) Inventor: Alexander Kusko, 10 Longwood Dr., Westwood, MA (US) 02090

( * ) Notice: Subject to any disclaimer, the term of this patent is extended or adjusted under 35 U.S.C. 154(b) by 15 days.

(21) Appl. No.: 10/741,096

(22) Filed: Dec. 19, 2003

(65) Prior Publication Data

US 2005/0134238 A1 Jun. 23, 2005

(51) Int. Cl.
*H02K 19/34* (2006.01)

(52) U.S. Cl. ........................ 322/90; 310/184; 310/198; 310/269

(58) Field of Classification Search ................ 310/184, 310/198, 140–145, 269; 322/90; 307/16; 336/5

See application file for complete search history.

(56) References Cited

U.S. PATENT DOCUMENTS

| | | | | |
|---|---|---|---|---|
| 678,904 | A * | 7/1901 | Rice | 310/225 |
| 3,441,764 | A * | 4/1969 | Grooms et al. | 310/198 |
| 3,771,046 | A * | 11/1973 | Harter | 322/63 |
| 3,793,544 | A * | 2/1974 | Baumgartner et al. | 320/123 |
| 3,809,995 | A * | 5/1974 | Hardin | 307/18 |
| 3,930,175 | A * | 12/1975 | Chirgwin | 310/160 |
| 4,163,187 | A * | 7/1979 | Thomas | 322/29 |
| 5,317,299 | A * | 5/1994 | Dhyanchand et al. | 336/5 |
| 5,764,036 | A * | 6/1998 | Vaidya et al. | 322/90 |
| 6,373,230 | B1 * | 4/2002 | Jabaji | 322/28 |
| 6,693,403 | B1 * | 2/2004 | Chen | 318/701 |

FOREIGN PATENT DOCUMENTS

| | | |
|---|---|---|
| JP | 8-065977 | * 3/1996 |
| JP | 2001-275322 | * 10/2001 |

* cited by examiner

*Primary Examiner*—Burton Mullins
(74) *Attorney, Agent, or Firm*—Fish & Richardson P.C.

(57) ABSTRACT

There are apparatus and methods for generating a plurality of voltage levels. There is a rotor that includes a first and a second portion of rotor windings. The first portion of rotor windings is constructed and arranged to establish a first magnetic field of a first number of poles. The second portion of rotor windings is constructed and arranged to establish a second magnetic field of a second number of poles. A stator is disposed adjacent the rotor. The stator includes a first and a second portion of stator windings. The first portion of stator windings is related to the first number of poles and has a first output port configured for furnishing an electrical output at a first voltage level. The second portion of stator windings is related to the second number of poles and has a second output port configured for furnishing an electrical output at a second voltage level.

14 Claims, 8 Drawing Sheets

MULTIPLE VOLTAGE GENERATING

This invention relates to generators, and more particularly to generating multiple voltages.

BACKGROUND OF THE INVENTION

To supply an automobile with power once the engine is running, an automobile includes a generator. A typical generator contains a moving rotor and a stationary stator. A voltage regulator circuit supplies current to the moving rotor to generate a magnetic field in the rotor. The magnetic field from the moving rotor induces a voltage in the stator as the rotating rotor moves past the stationary stator. Typically a regulator regulates the voltage by controlling current to the rotor, thus regulating the voltage induced in the stator to produce a constant voltage for the electrical load.

Generators for automobiles typically generate a voltage of 14 volts after rectification. With electrical loads for automobiles increasing, the automobile industry is considering higher voltages, such as 42 volts.

SUMMARY OF THE INVENTION

It is an important object of the invention to provide multiple voltages from a generator, such as for a vehicle.

In one aspect there is an apparatus for generating an electrical output of a plurality of voltage levels. The apparatus includes a rotor and a stator disposed adjacent the rotor. The rotor includes a first portion of rotor windings corresponding to a first magnetic field of a first number of poles, and a second portion of rotor windings corresponding to a second magnetic field of a second number of poles. The stator includes a first portion of stator windings corresponding to the first number of poles and having a first output port configured for an electrical output at a first voltage level. The stator also includes a second portion of stator windings corresponding to the second number of poles and having a second output port configured for an electrical output at a second voltage level.

In other examples, the apparatus can include the following features. The first magnetic field can be orthogonal to the second magnetic field. The first portion of stator windings and the second portion of stator windings can be electrically independent. The apparatus can include a first excitation port electrically connected to the first portion of rotor windings and a second excitation port electrically connected to the second portion of rotor windings. The apparatus can include a first voltage regulator electrically connected to the first excitation port and the first output port, and a second voltage regulator electrically connected to the second excitation port and the second output port.

The apparatus can include a first AC to DC circuit electrically connected to the first output port, and a second AC to DC circuit electrically connected to the second output port. The apparatus can include a first full-bridge diode rectifier included in the first AC to DC circuit, and a second full-bridge diode rectifier included in the second AC to DC circuit. The rotor can include a salient pole rotor. The apparatus can include a shaft on which the rotor is disposed. The first number of poles can correspond to two poles and the second number of poles can correspond to six poles. The first voltage level can be substantially 14 volts and the second voltage level can be substantially 42 volts. The apparatus can include a first commutator electrically connected to the first portion of stator windings and a second commutator electrically connected to the second portion of stator windings.

In another aspect, there is a method for generating a plurality of voltage levels using a single generator. The method includes generating a first voltage including, controlling current into a first portion of rotor windings corresponding to a first magnetic field of a first number of poles, and moving the first portion of rotor windings past a first portion of stator windings corresponding to the first number of poles to thereby induce the first voltage in the first portion of stator windings. The method also includes generating a second voltage including, controlling current into a second portion of rotor windings corresponding to a second magnetic field of a second number of poles, and moving the second portion of rotor windings past a second portion of stator windings corresponding to the second number of poles to thereby induce the second voltage in the second portion of stator windings.

In other examples, the method can include the following features. The method can include rectifying the first voltage to generate a first DC voltage, and rectifying the second voltage to generate a second DC voltage. The method can include orienting the first magnetic field orthogonal to the second magnetic field. The method can include arranging the first portion of stator windings and the second portion of stator windings to be electrically independent. The rotor can reside on a shaft and the method can include moving the first portion of rotor windings by rotating the shaft, and moving the second portion of rotor windings by rotating the shaft. The first number of poles can correspond to two poles and the second number of poles can correspond to six poles.

In another aspect, there is a method for making a single generator that generates a plurality of voltage levels. The method includes winding a first portion of rotor windings corresponding to a first magnetic field of a first number of poles, and winding a second portion of rotor windings corresponding to a second magnetic field of a second number of poles. The method also includes winding a first portion of stator windings corresponding to the first number of poles, and connecting a first output port configured for an electrical output at a first voltage level to the first portion of stator windings. The method also includes winding a second portion of stator windings corresponding to the second number of poles, and connecting a second output port configured for an electrical output at a second voltage level to the second portion of stator windings. In other examples, the method can include any of the features described above.

The details of one or more examples are set forth in the accompanying drawings and the description below. Other features, objects, and advantages of the invention will be apparent from the description and drawing, in which:

BRIEF DESCRIPTION OF THE SEVERAL VIEWS OF THE DRAWING

Like reference symbols in the various drawings indicate like elements.

DETAILED DESCRIPTION

Figure 1:
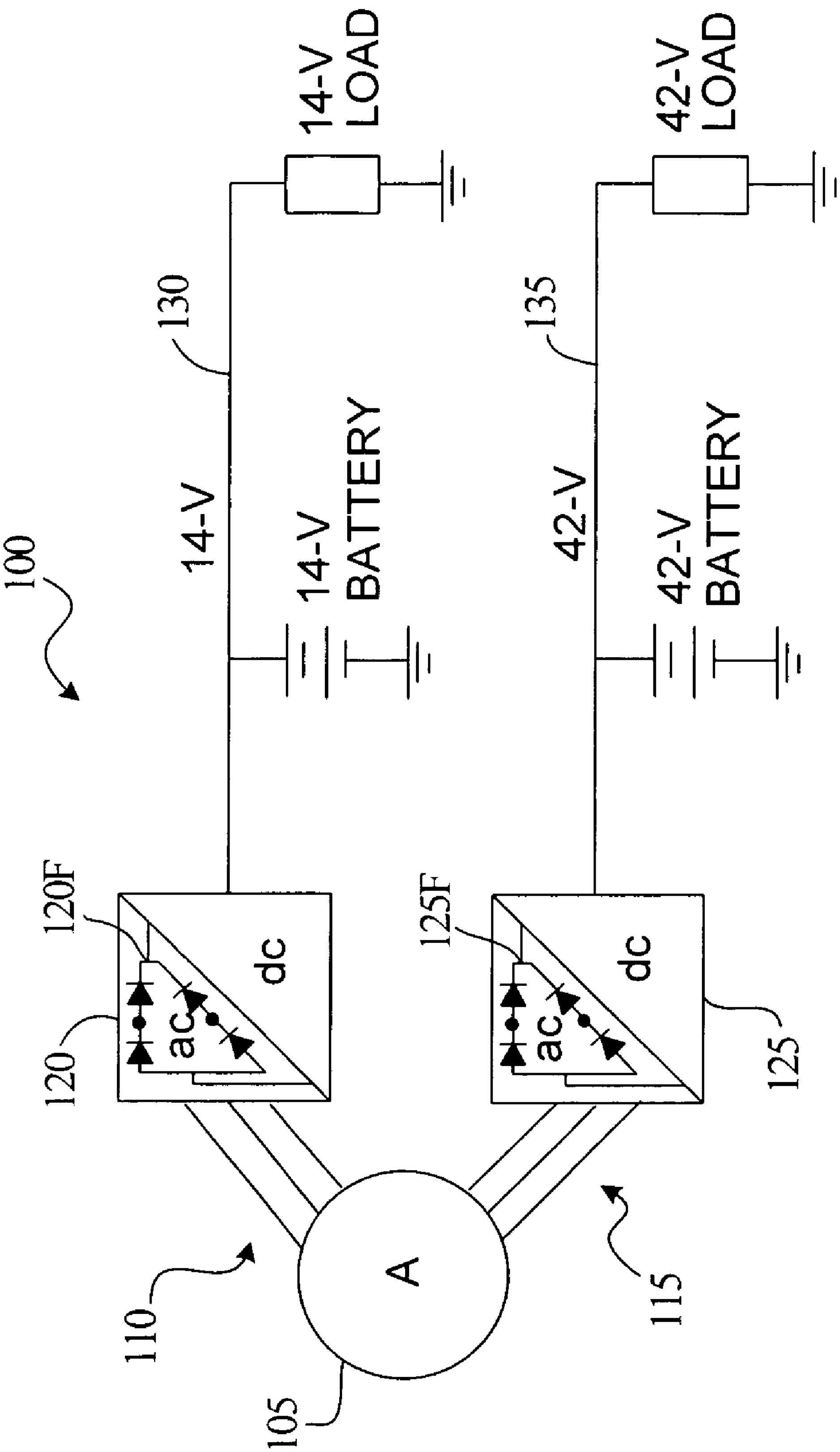
FIG. 1 is a block diagram of a dual voltage electrical system.

FIG. 1 illustrates a dual-voltage electrical system 100. System 100 includes a dual voltage alternator 105 that has a first output port 110 corresponding to a first voltage level and a second output port 115 corresponding to a second output voltage. Generator 105 provides independent control of the two output ports in a single-frame generator. Generally, in a generator the radial air-gap magnetic field is a space sinusoid produced by a rotating field structure of a designated number of poles. This radial magnetic field induces voltage in a stator winding of the same pole number. As described in more detail below, to produce the two voltages, generator 105 generates a magnetic field of a first pole number and a magnetic field of a second pole number and has corresponding stator windings corresponding to these two fields, allowing independent control of each. In other words, generator 105 includes a first radial air-gap magnetic field of a first pole number, produced by a suitable winding on the rotating field structure to induce a first voltage in a first stator winding of the first pole number. Generator 105 also includes a second radial air-gap magnetic field of a second pole number, produced by a suitable winding on the rotating field structure to induce a second voltage in a second stator winding of the second pole number. In one example, the two radial air-gap magnetic fields are selected to be orthogonal so that the fundamental components do not interfere with each other in the stator windings. The radial air-gap magnetic fields are orthogonal when, for example, the integral of the product of the space sinusoidal functions describing the radial magnetic fields over the periphery of the stator is zero.

To use the dual voltage output of generator 105, system 100 may include a first alternating current (AC) to direct current (DC) circuit 120 that is electrically connected to the first output terminal 110 of alternator 105 and a second AC to DC circuit 125 that is electrically connected to the second output terminal 115 of generator 105. The first and second AC to DC circuits 120 and 125 include, for example, a full-bridge diode rectifier, such as 120F and 125F, respectively, to perform the conversion. The first AC to DC circuit 120 is electrically connected to a 14-volt conductor 130 and the second AC to DC circuit 125 is electrically connected to 42-volt conductor 135. Conductors 130 and 135 are electrically connected to batteries 140 and 145, respectively. Batteries 140 and 145 can supply electricity to their respective conductors when generator 105 is not running and become loads to the generator when the generator is running. In an automobile system, generator 105 includes a shaft on which the rotor is located. The shaft is connected to the engine, for example by a pulley and belt. When the engine is running, the engine causes rotation of the rotor via the belt and shaft, which, as described in more detail below, causes a generated voltage in the stator windings. The two voltage levels (i.e., 14 and 42) are chosen in this illustrative example because they represent a suitable dual-voltage system for automobiles. Other voltage level combinations are applicable for the techniques described herein.

Figure 2:
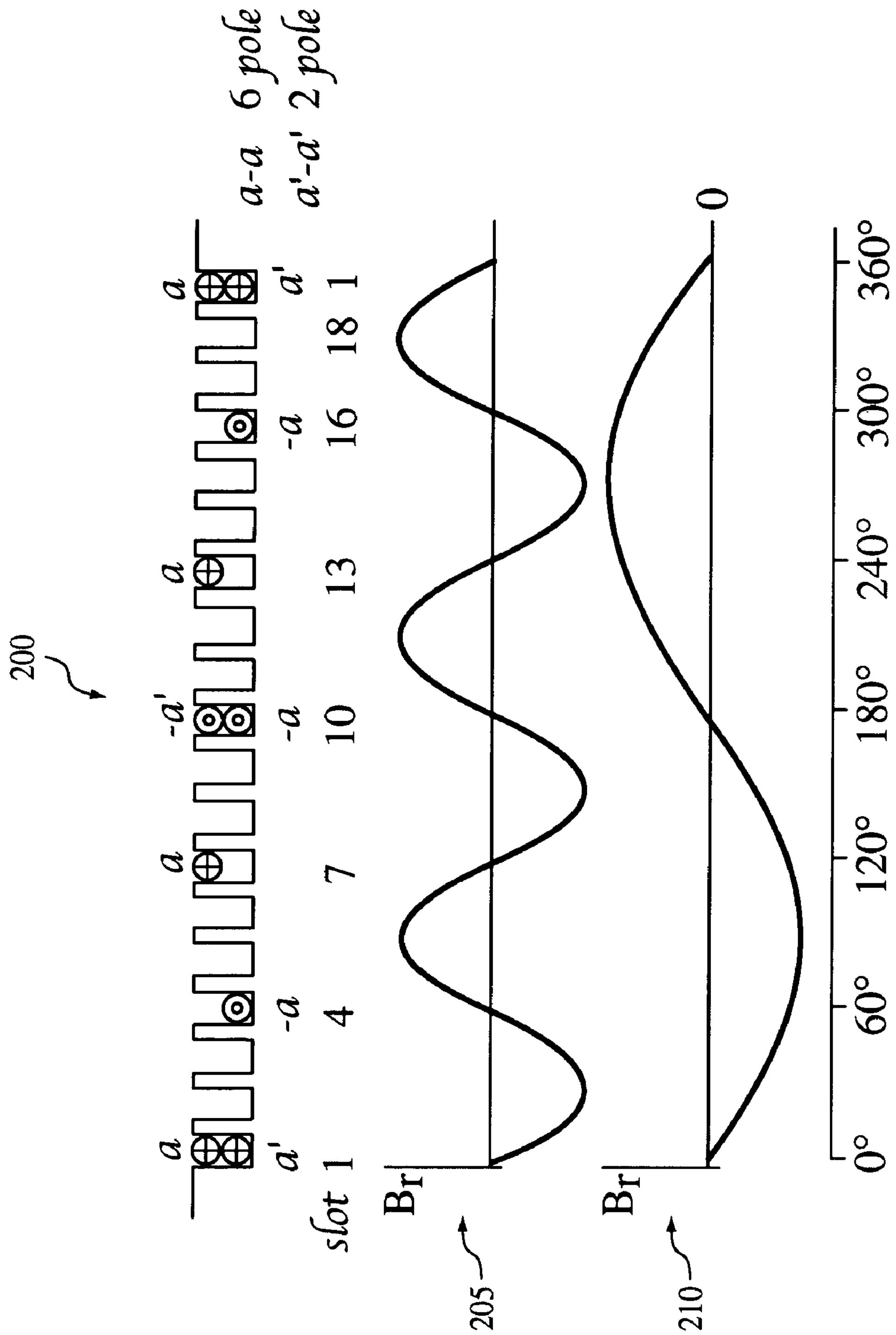
FIG. 2 is a diagram of stator windings of different pole numbers and corresponding graphs of current effects on radial magnetic fields.
Figure 3:
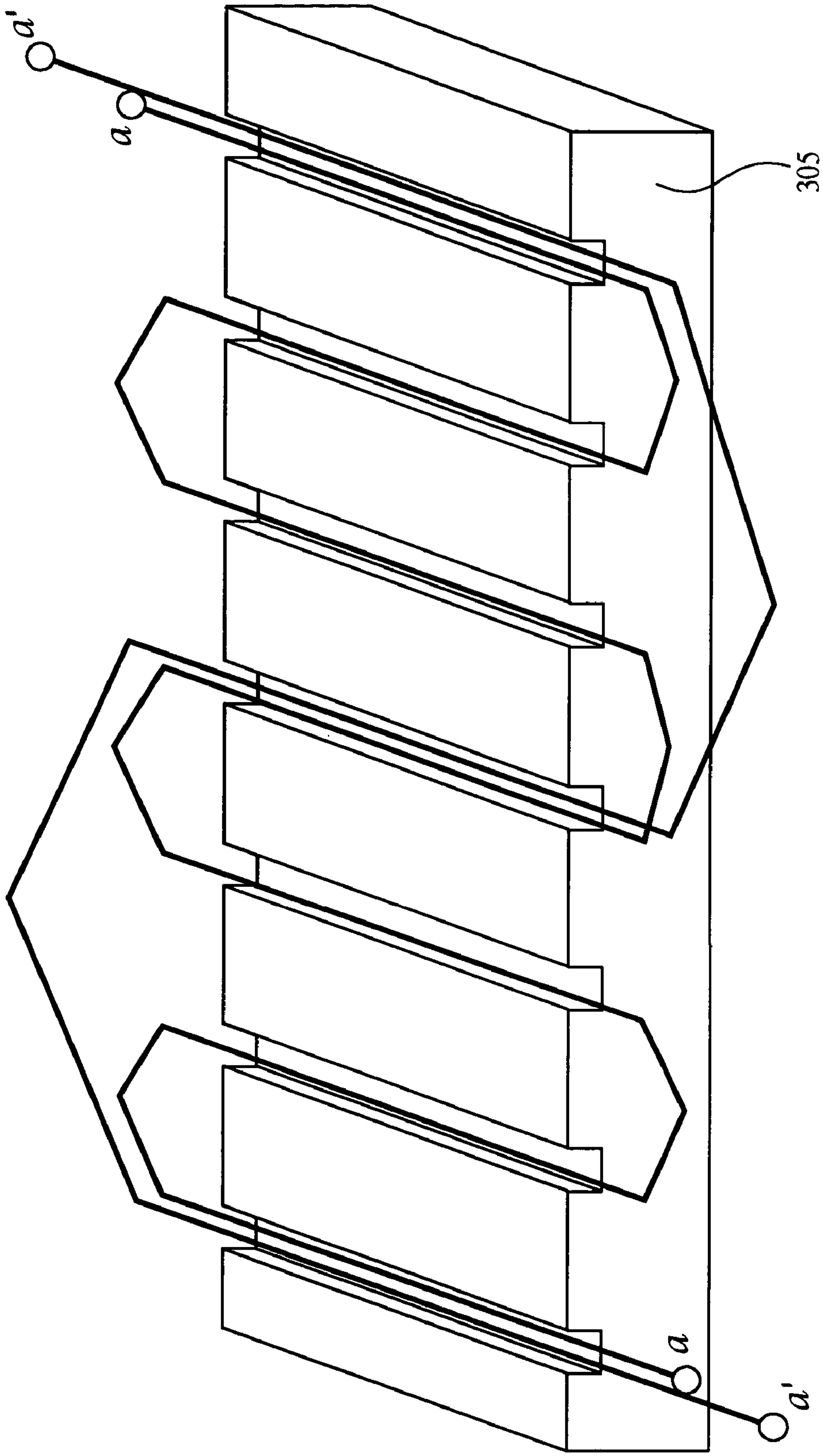
FIG. 3 is a perspective view of stator windings of different pole numbers.
Figure 4:
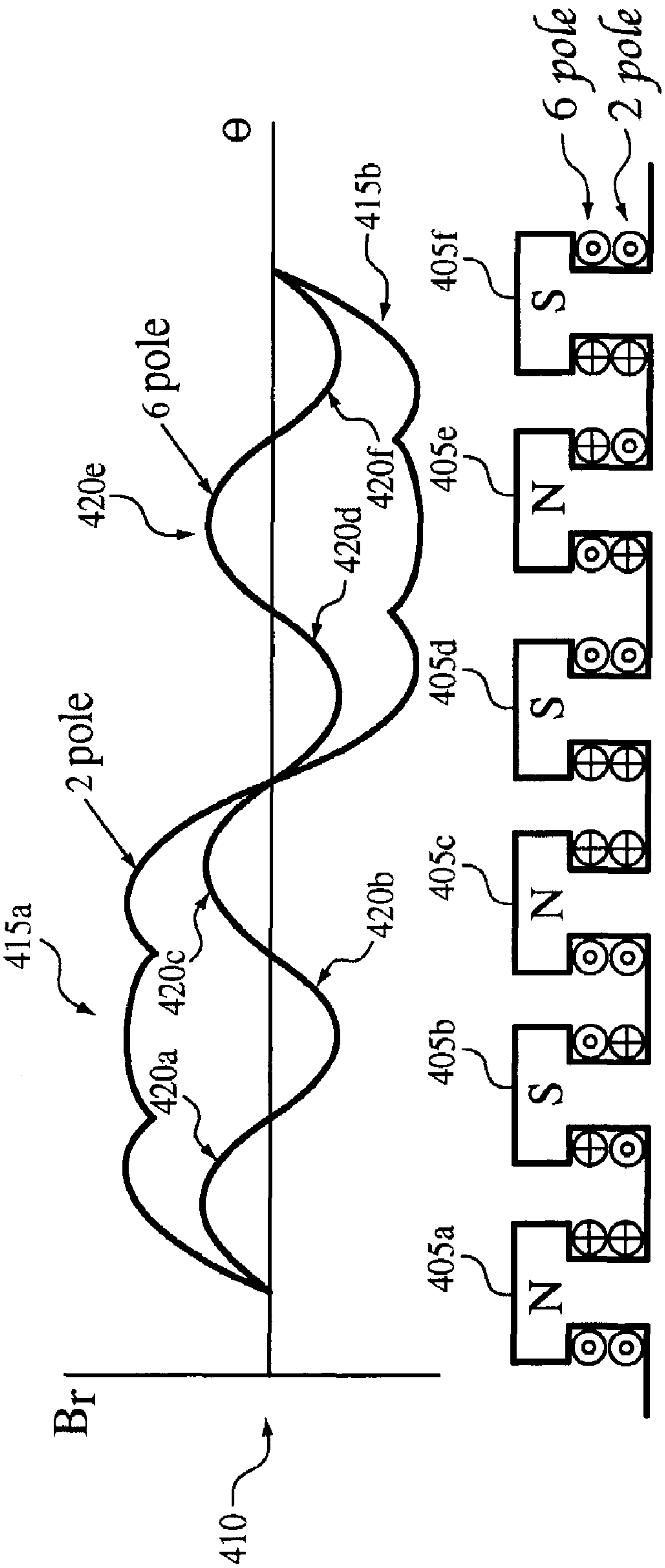
FIG. 4 is a diagram of rotor windings of different pole numbers and corresponding graphs of generated fields.

As described above, generator 105 uses fields corresponding to different pole numbers to independently generate and control different voltage levels. FIGS. 2–4 illustrate exemplary stator windings and rotor windings of generator 105 that correspond to two pole numbers. The examples use a 2-pole field and a 6-pole field to illustrate the concept, but other pole numbers can be used. As described above, some examples choose pole numbers that advantageously provide two orthogonal fields that do not interact in the air-gap or in the windings.

FIG. 2 illustrates a portion 200 of a stator, with one phase of a 6-pole winding, referenced as a—a, and a 2-pole winding, referenced as a'—a'. Portion 200 illustrates 19 slots, to show that 18 slots are used for the 2-pole and 6-pole windings, and then the winding pattern is repeated. The first winding a—a is a 6-pole winding with a span of 3 slots. The second winding a'—a' is a 2-pole winding with a span of 9 slots. The position of the coil sides is shown in portion 200, using the convention of a dot representing the winding coming out of the page and an x representing the winding going into the page. The radial magnetic air-gap fields produced by unit current in each winding are shown in graphs 205 and 210. Graph 205 corresponds to the 6-pole winding a-a and graph 210 corresponds to the 2-pole winding a'—a'. For single conductors in the slots, the radial field is a square wave in space. The sinusoidal waveforms shown in graphs 205 and 210 can be regarded as the fundamental component of the magnetic field, or the effect of a distributed winding in generator 105.

FIG. 3 illustrates a perspective view of a stator core 305 and windings a'—a', corresponding to a 2-pole winding, and a—a, corresponding to a 6-pole winding. For simplicity, stator core 305 is illustrated as a "flattened" section of the cylindrical core of alternator 105. The positions of the two windings a—a and a'—a' are shown in shared or independent slots. In this example, the windings are electrically independent.

FIG. 4 illustrates a portion 400 of a rotor with a 6-pole winding and a 2-pole winding. Portion 400 depicts the two windings on a salient-pole rotor to produce 6-pole and 2-pole radial air-gap magnetic fields. Other winding patterns, for example, a non-salient pole (wound rotor) can also be used. Portion 400 includes 6 salient poles 405*a*–*f*. Each pole 405 has one coil for the 6-pole winding pattern and one coil for the 2-pole winding pattern. The direction of the winding for each pole 405 depends on the pole number to which the rotor winding corresponds. The two windings can be excited independently from the batteries through slip rings or other means and be controlled by independent voltage regulators. Generally, the voltage regulators are electrically connected to excitation terminals of the rotor coils. The voltage regulator controls the average current through the rotor coils, thus controlling the magnetic fields generated by the coils to maintain the voltage substantially constant. Because each rotor coil has its own excitation terminals and voltage regulator, the voltage outputs of generator 105 can be independently regulated.

FIG. 4 also includes graph 410. Graph 410 illustrates the radial air-gap magnetic fields produced by the salient poles of portion 400. For the 2-pole field, three sequential poles, 405*a*–*c* and 405*d*–*f*, produce elements 415*a* and 415*b* of the 2-pole field. For the 6-pole field, each independent pole 405*a*–*f* produces each element of the field 420*a*–*f*.

Figure 5:
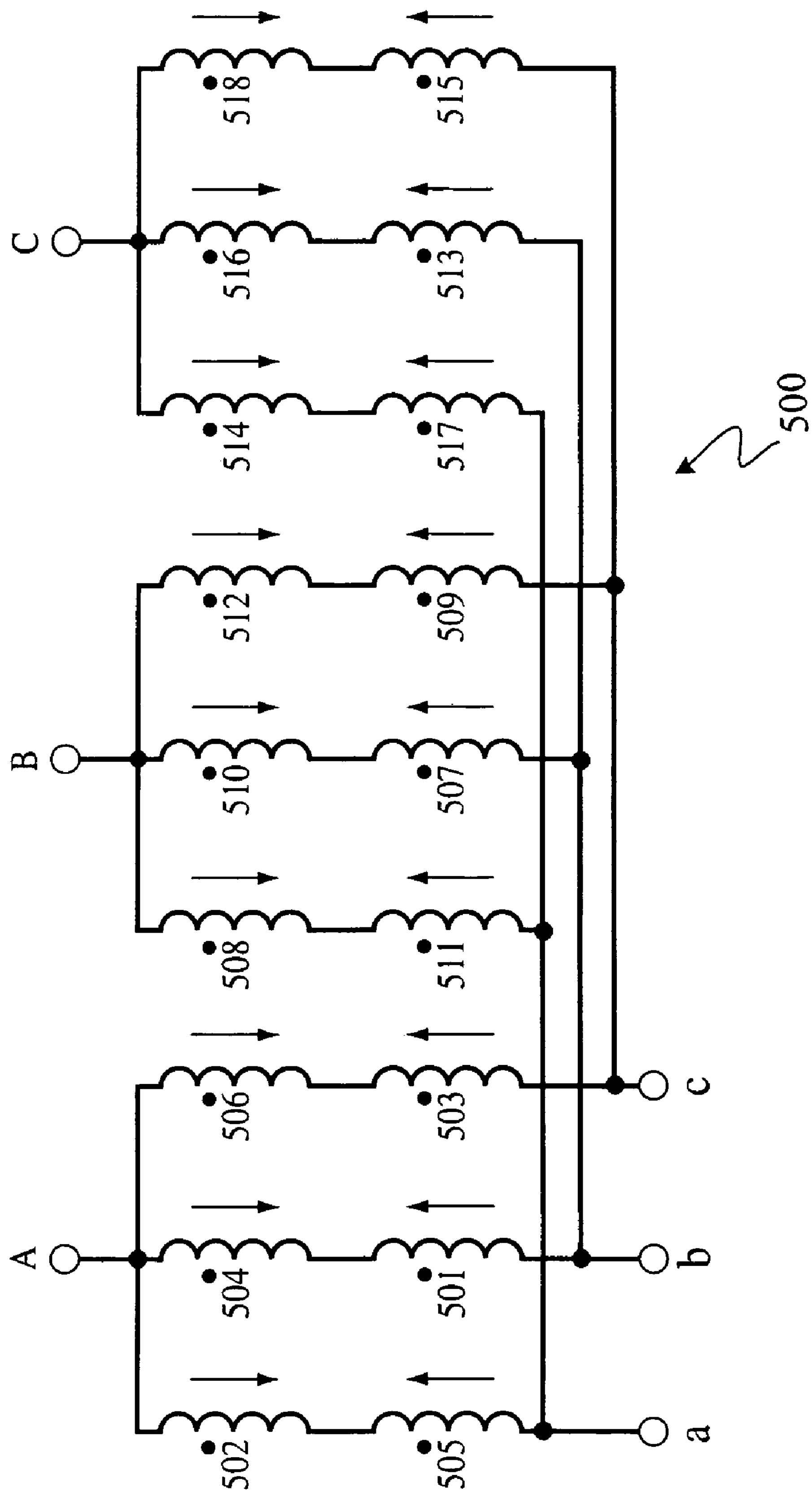
FIG. 5 is a diagram of single 3-phase stator windings of different pole numbers.

FIGS. 2–4 illustrate single phase, electrically independent windings to describe the concept of rotor and stator windings corresponding to two different poles numbers. In other examples, alternator 105 can have 3-phase windings. Further, including two different pole number windings can be implemented using windings that are not electrically independent. For example, FIG. 5 illustrates a 3-phase stator winding 500 where the coils for two different pole numbers are not electrically independent. Winding 500 includes 18 coils 501–518. Using stator winding 500 with, for example, the rotor windings illustrated in FIG. 4, the A, B, C terminals correspond to the 6-pole field and the a, b, c terminals correspond to the 2-pole field. This combination can produce two sets of 3-phase voltages under the control of the two rotor field currents, again advantageously allowing independent control of the two voltage levels. Winding 500 can be used, for example, in a 42/14V DC automotive system if the 42V and 14V loads do not use a common ground, e.g., the frame.

Figure 6:
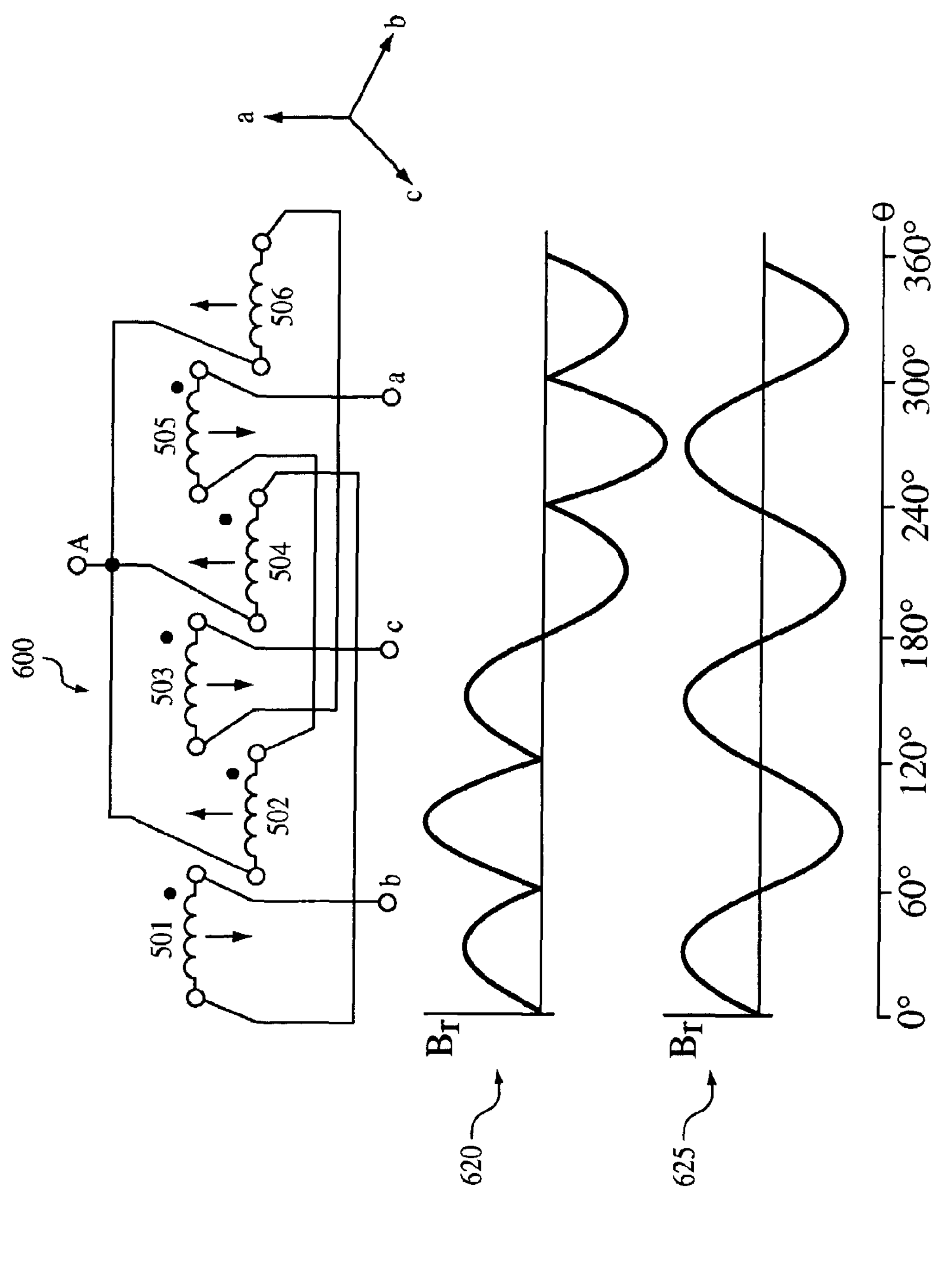
FIG. 6 is a diagram of stator windings of different pole numbers and corresponding graphs of current effects on radial magnetic fields.

FIG. 6 illustrates a single-phase stator winding portion 600 of winding 500, where the coils for two different pole numbers are not electrically independent. Winding portion 600 includes six coils of winding 500, namely coils 501–506 shown in their spatial order in the periphery of the stator. Using stator winding portion 600, for example, and the rotor windings illustrated in FIG. 4, the A terminal corresponds to the 6-pole field and the a, b, c terminals correspond to the 2-pole field. FIG. 6 also includes graphs 620 and 625 to illustrate how the single winding portion 600 produces radial air-gap magnetic fields with 6- and 2-pole numbers. The six coils 501–506 of winding portion 600 each span 60 degrees, electrical, to cover 360 degrees. The arrows show the directions of the radial air-gap field for current into the dotted end of each coil. The 2-pole field produced by the currents in terminals a, b, and c, is shown in graph 620. The graphed 2-pole field corresponds to a time when the current in terminal a is at, e.g., 1.0 per unit (p.u.), which refers to the base value, and the currents in terminals b and c are at −0.5 p.u. The winding is wye-connected, because the ends of the windings opposite terminals a, b, and c, terminate at the same point, terminal A. The 6-pole field produced by the currents into terminal A is shown in graph 625. The graphed 6-pole field corresponds to a time when the current in terminal A is at, e.g., 1.0 p.u.

Figure 7:
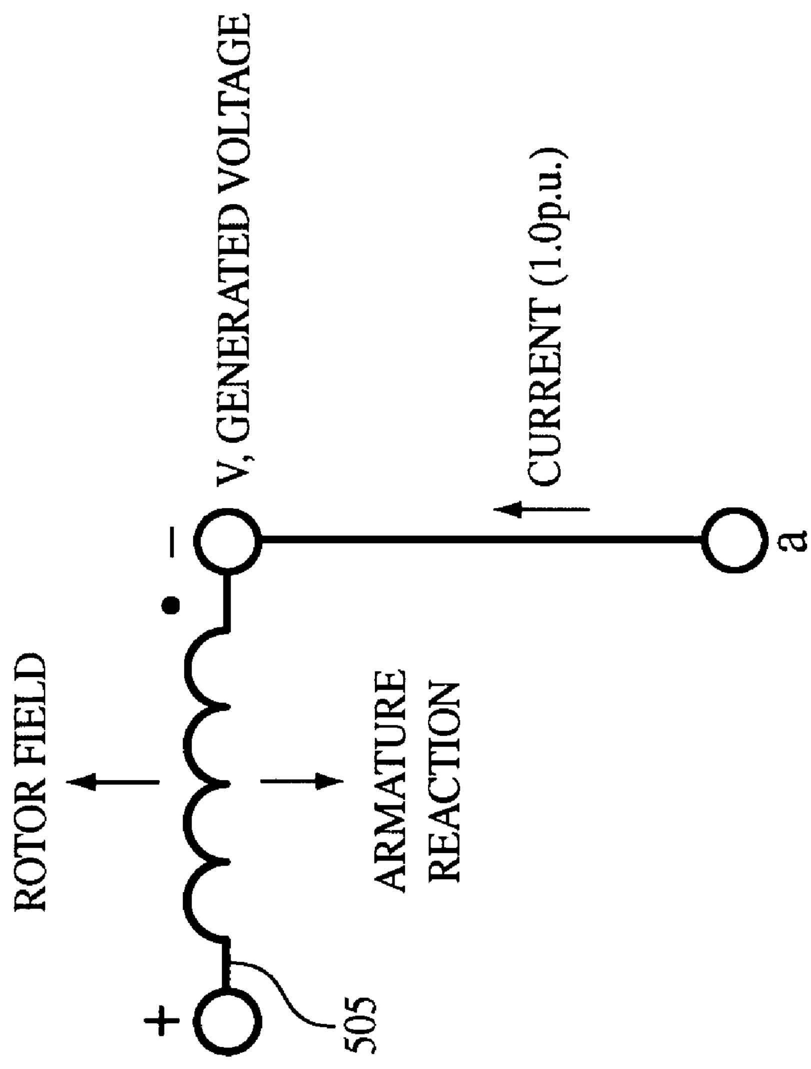
FIG. 7 is a diagram of generated voltage of a stator winding.

As described above, graphs 620 and 625 illustrate the fields produced by currents through the winding. These fields react with fields produced by the rotor windings to generate a voltage across the stator windings. FIG. 7 illustrates how voltages are generated across a stator winding, using winding 505 as an example. The "armature reaction" arrow represents the radial air-gap magnetic field produced by current in the winding (e.g., graphs 620 and 625). The windings of a rotor (e.g., 400 of FIG. 4) produce the "rotor field" arrow. The resultant radial magnetic field generates the voltage v that appears at the output terminals of alternator 105. FIG. 7 illustrates a case where the direction of the radial magnetic field applied by the rotor is in the opposite direction to the armature reaction field. In this case, the polarity of the generated voltage v in coil 505 coincides with the direction of the current at that instant of time.

Figure 8:
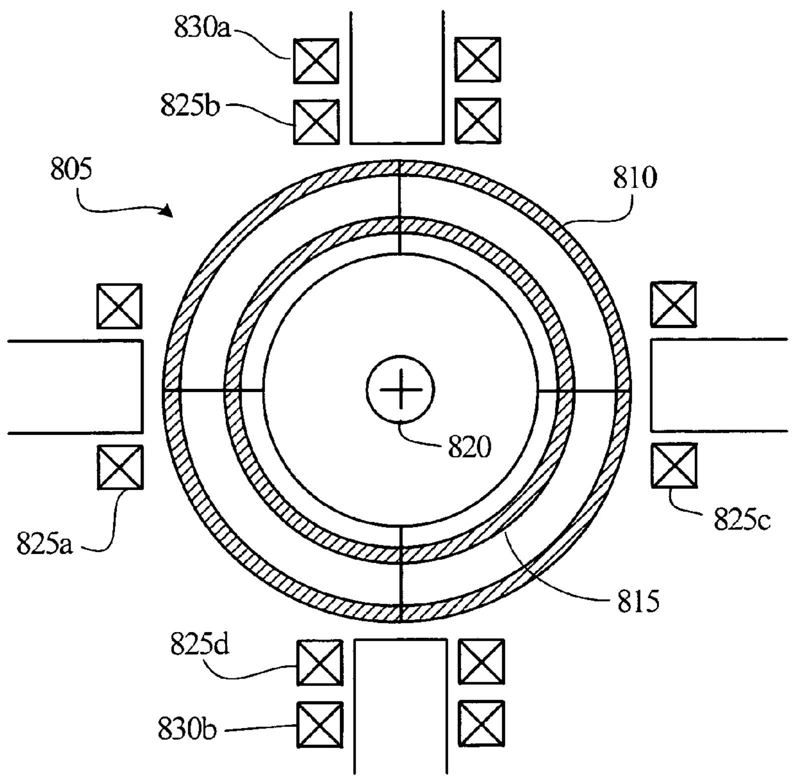
FIG. 8 is a cross-sectional view of an armature for a direct current generator.

FIG. 8 illustrates a cross-sectional view of a direct current (DC) generator that produces two voltage levels using a 2-pole field and a 4-pole field. The DC generator includes an armature 805, which includes a 4-pole winding 810 and a 2-pole winding 815. Armature 805 is attached to a shaft 820, which rotates armature 805 in operation. To induce current in armature 805 during rotation, the DC generator also includes 4-pole field coils 825*a*–*d* and 2-pole field coils 830*a*–*b*. As described above, the field coils of each pole number can be controlled independent of each other, so that each of the output voltage levels associated with each pole number can be regulated independent of each other.

Figure 9:
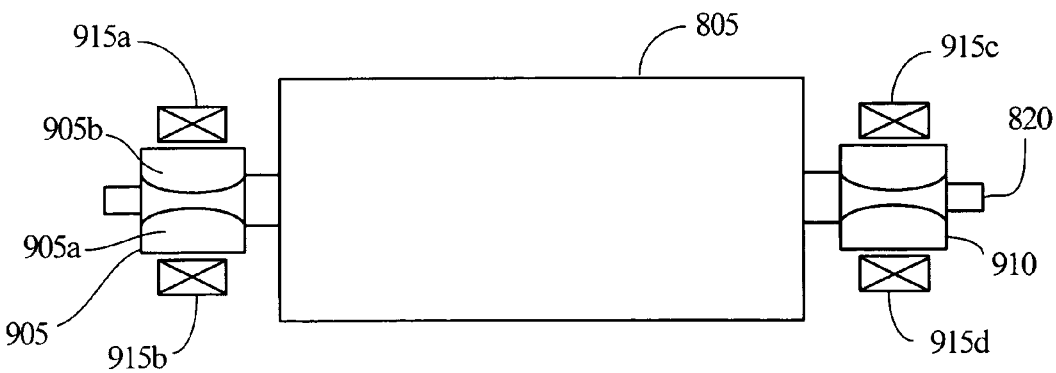
FIG. 9 is a side view of an armature for a direct current generator.

FIG. 9 illustrates a side view of armature 805. A DC generator includes commutators 905 and 910, both of which are attached to shaft 820 and electrically connected to armature 805. Commutator 905 is electrically connected to the 4-pole winding 810 and commutator 910 is electrically connected to the 2-pole winding 815. A commutator is basically a slip ring that is split into two or more elements that are insulated from each other and from the shaft 820. For example, commutator 905 has two elements 905*a* and 905*b*. Each element 905*a* and 905*b* is connected to a different end of the 4-pole winding 810. In the illustrated position of shaft 820, brush 915*a* is in electrical contact with commutator element 905*b* and brush 915*b* is in electrical contact with commutator element 905*a*. As the shaft rotates one-half a turn (180 degrees), then the brushes 915*a* and 915*b* are now in contact with element 905*a* and 905*b*, respectively, the opposite of what is illustrated. The same thing happens with brushes 915*c*–*d* and the elements of commutator 910. Commutators 905 and 910 eliminate the need for an additional rectifying circuit, as the commutators perform this function.

Implementations can realize one or more of the following advantages. There is a simple self-contained unit, compared to two generators, or a generator plus one or more dc/dc converters. The generator can be built of standard laminations and utilize standard voltage regulators. The generator is not limited in size. There is relatively low internal impedance of the windings, which reduces rectifier commutation effects and internal voltage drop. For example, use of a salient-pole or round rotor over the Lundell rotor, commonly used in automobile generators, reduces the internal impedance of the generator. The consequence can be a reduction in rectifier commutation overlap angle and a reduction in ac internal voltage and generator size to achieve prescribed rectified dc voltage. In addition, the peak-to-peak ripple in the rectified voltage is reduced.

A number of embodiments of the invention have been described. Nevertheless, it will be understood that various modifications may be made without departing from the spirit and scope of the invention. For example, the generator can produce three or more levels of voltage by using three or more pole numbers for the radial air-gap magnetic fields. For certain pole combinations, a single rotor winding with two excitation ports can produce radial magnetic fields of two pole numbers. The generator can utilize a rotor with permanent magnets for the poles corresponding to a first one of the pole numbers and windings for a second one of the pole numbers. In such embodiments, the voltages produced by the wound field are regulated. The functions of the rotor and the stator can be interchanged by using slip rings and brushes to make connections to the winding ports. Accordingly, other embodiments are within the scope of the following claims.

What is claimed is:

1. Apparatus for generating an electrical output of a plurality of voltage levels comprising, a salient pole rotor including, a first portion of rotor windings corresponding to a first magnetic field of a first number of poles, and a second portion of rotor windings corresponding to a second magnetic field of a second number of poles; and a stator disposed adjacent the rotor, the stator including,
a first portion of stator windings corresponding to the first number of poles and having a first output port configured for an electrical output at a first voltage level, and
a second portion of stator windings corresponding to the second number of poles and having a second output port configured for an electrical output at a second voltage level.

2. The apparatus of claim 1 wherein the first magnetic field is orthogonal to the second magnetic field.

3. The apparatus of claim 1 wherein the first portion of stator windings and the second portion of stator windings are electrically independent.

4. The apparatus of claim 1 wherein the first portion of stator windings and the second portion of stator windings are part of a single stator winding.

5. The apparatus of claim 1 wherein the first portion of rotor windings and the second portion of rotor windings are part of a single rotor winding.

6. The apparatus of claim 5 wherein the first magnetic field and the second magnetic field are produced using a first excitation current and a second excitation current.

7. The apparatus of claim 1 further comprising:
a first excitation port electrically connected to the first portion of rotor windings;
a second excitation port electrically connected to the second portion of rotor windings;
a first voltage regulator electrically connected to the first excitation port and the first output port; and
a second voltage regulator electrically connected to the second excitation port and the second output port.

8. The apparatus of claim 1 further comprising:
a first AC to DC circuit electrically connected to the first output port; and
a second AC to DC circuit electrically connected to the second output port.

9. The apparatus of claim 8 further comprising:
a first full-bridge diode rectifier included in the first AC to DC circuit; and
a second full-bridge diode rectifier included in the second AC to DC circuit.

10. The apparatus of claim 1 wherein the rotor comprises a distributed winding rotor.

11. The apparatus of claim 1 further comprising a shaft on which the rotor is disposed.

12. The apparatus of claim 1 wherein the first voltage level is substantially 14 volts and the second voltage level is substantially 42 volts.

13. The apparatus of claim 1 further comprising
a third portion of rotor windings corresponding to a third magnetic field of a third number of poles included on the rotor; and
a third portion of stator windings corresponding to the third number of poles and having a third output port configured for an electrical output at a third voltage level.

14. The apparatus of claim 1 further comprising:
a first commutator electrically connected to the first portion of stator windings; and
a second commutator electrically connected to the second portion of stator windings.

* * * * *